United States Patent
Salazar et al.

(10) Patent No.: US 9,357,024 B2
(45) Date of Patent: May 31, 2016

(54) COMMUNICATION MANAGEMENT UTILIZING DESTINATION DEVICE USER PRESENCE PROBABILITY

(75) Inventors: Selena M. Salazar, Salinas, CA (US);
Brian Momeyer, Carlsbad, CA (US);
Babak Forutanpour, San Diego, CA (US); Andre Gustavo P. Schevciw, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 647 days.

(21) Appl. No.: 12/851,413

(22) Filed: Aug. 5, 2010

(65) Prior Publication Data

US 2012/0036261 A1    Feb. 9, 2012

(51) Int. Cl.
G06F 15/163  (2006.01)
G06F 15/16   (2006.01)
H04L 29/08   (2006.01)

(52) U.S. Cl.
CPC .............. *H04L 67/24* (2013.01); *H04L 67/22* (2013.01); *H04L 67/306* (2013.01)

(58) Field of Classification Search
CPC .......... G06K 9/00281; G06K 9/00288; G06K 9/00335; G06K 9/66; G06K 9/00; H04L 67/22; H04L 67/306; G06T 11/00; H04W 24/00; H04N 5/23219
USPC ............. 709/203, 225, 238; 455/67.11, 203, 455/225, 238; 345/156
See application file for complete search history.

(56) References Cited

U.S. PATENT DOCUMENTS

| | | | |
|---|---|---|---|
| 5,243,645 A | | 9/1993 | Bissell et al. |
| 5,659,596 A | | 8/1997 | Dunn |
| 5,974,162 A | * | 10/1999 | Metz et al. ................. 382/124 |
| 6,125,176 A | | 9/2000 | Foladare et al. |
| 6,311,272 B1 | * | 10/2001 | Gressel ....................... 713/186 |
| 6,421,453 B1 | * | 7/2002 | Kanevsky et al. ........... 382/115 |
| 6,429,927 B1 | * | 8/2002 | Borza ........................... 356/71 |
| 6,487,662 B1 | * | 11/2002 | Kharon et al. ............... 713/186 |
| 7,130,452 B2 | * | 10/2006 | Bolle et al. .................. 382/115 |
| 7,133,792 B2 | * | 11/2006 | Murakami ......... G06K 9/00536 702/104 |
| 7,764,274 B2 | | 7/2010 | Westerman et al. |
| 7,828,739 B2 | * | 11/2010 | Arnold ......................... 600/483 |
| 7,953,462 B2 | * | 5/2011 | Harry ......................... 455/575.1 |
| 8,031,175 B2 | | 10/2011 | Rigazio et al. |
| 8,334,993 B2 | * | 12/2012 | Singh ........................ 358/1.15 |
| 2001/0048025 A1 | * | 12/2001 | Shinn ........................... 235/382 |
| 2002/0169554 A1 | * | 11/2002 | Suda ............................ 701/216 |
| 2003/0126593 A1 | * | 7/2003 | Mault ............................ 725/10 |
| 2005/0030151 A1 | * | 2/2005 | Singh ........................... 340/5.8 |

(Continued)

FOREIGN PATENT DOCUMENTS

CN     1629870 A      6/2005
CN     201383157 Y    1/2010

(Continued)

OTHER PUBLICATIONS

International Search Report and Written Opinion—PCT/US2011/046813, ISA/EPO—Oct. 21, 2011.

*Primary Examiner* — Sargon Nano
(74) *Attorney, Agent, or Firm* — Won Tae C. Kim

(57) ABSTRACT

An apparatus, system and method for forwarding a communication from a communication receiving device to a destination device based upon the identity of the user of the destination device.

51 Claims, 8 Drawing Sheets

(56) References Cited

U.S. PATENT DOCUMENTS

| | | | |
|---|---|---|---|
| 2005/0068166 A1* | 3/2005 | Baker | 340/531 |
| 2006/0034726 A1* | 2/2006 | Sunshine | B82Y 15/00 702/22 |
| 2006/0189872 A1* | 8/2006 | Arnold | 600/483 |
| 2006/0195328 A1* | 8/2006 | Abraham et al. | 705/1 |
| 2006/0206724 A1* | 9/2006 | Schaufele et al. | 713/186 |
| 2007/0055666 A1* | 3/2007 | Newbould | G06Q 30/02 |
| 2007/0100666 A1* | 5/2007 | Stivoric | A61B 5/0008 705/3 |
| 2007/0198932 A1* | 8/2007 | Uchimura | G11B 27/105 715/723 |
| 2007/0198937 A1* | 8/2007 | Paris | 715/745 |
| 2007/0214228 A1 | 9/2007 | Horvitz et al. | |
| 2007/0264981 A1 | 11/2007 | Miller | |
| 2008/0092245 A1* | 4/2008 | Alward | G06F 21/316 726/28 |
| 2008/0292079 A1* | 11/2008 | Toutain et al. | 379/201.01 |
| 2009/0006613 A1* | 1/2009 | Toutain | H04L 67/24 709/224 |
| 2009/0318815 A1* | 12/2009 | Barnes et al. | 600/473 |
| 2009/0326383 A1* | 12/2009 | Barnes et al. | 600/476 |
| 2010/0042564 A1 | 2/2010 | Harrison et al. | |
| 2010/0134424 A1 | 6/2010 | Brisebois et al. | |
| 2010/0225443 A1 | 9/2010 | Bayram et al. | |
| 2010/0248822 A1 | 9/2010 | Migos et al. | |
| 2011/0115604 A1 | 5/2011 | Sobel et al. | |
| 2011/0254865 A1 | 10/2011 | Yee et al. | |
| 2012/0002563 A1* | 1/2012 | Flanagan | 370/252 |
| 2013/0109369 A1 | 5/2013 | Forutanpour et al. | |
| 2014/0235225 A1 | 8/2014 | Forutanpour et al. | |

FOREIGN PATENT DOCUMENTS

| | | | |
|---|---|---|---|
| CN | 101782805 A | 7/2010 | |
| GB | WO 2007113516 | * 11/2007 | G06F 17/30 |
| JP | H05260188 A | 10/1993 | |
| JP | 2001156921 A | 6/2001 | |
| JP | 2003163739 A | 6/2003 | |
| JP | 2007116602 A | 5/2007 | |
| JP | 2011523730 A | 8/2011 | |
| WO | WO2007113516 A1 | 10/2007 | |
| WO | WO-2009131987 A2 | 10/2009 | |
| WO | WO-2012091574 A1 | 7/2012 | |

* cited by examiner

US 9,357,024 B2

COMMUNICATION MANAGEMENT UTILIZING DESTINATION DEVICE USER PRESENCE PROBABILITY

FIELD

This disclosure relates generally to apparatus and methods for managing communication based upon the probability of a user being at a destination device.

BACKGROUND

Various communication forwarding scenarios are available. In centralized call forwarding, communication will be forwarded based upon pre-configured instructions associated with ranges of time of day and date. For example, communication received at a central number is forwarded to a work wireline telephone on weekdays during business hours and otherwise is forwarded to a home wireline telephone. Today, however, users own increasing numbers of devices, which often includes multiple telephones per person. The resulting plethora of devices lacks a reliable method of determining routing from any given communication receiving device to a final destination device that the user is using at the time of the communication. This invention addresses reliable forwarding of incoming communication to an appropriate destination device.

SUMMARY OF THE INVENTION

An aspect of the present invention may reside in a method of: receiving a communication comprising receiving a request for a user presence probability, determining a measured user-specific characteristic, comparing the measured user-specific characteristic to a stored user-specific characteristic, determining a characteristic-specific user presence probability, determining a user presence probability, sending the user presence probability, and receiving a communication.

Another aspect of the present invention may reside in an apparatus to: receive a communication comprising a processor configured to: determine a measured user-specific characteristic, compare the measured user-specific characteristic to a stored user-specific characteristic, determine a characteristic-specific user presence probability, and determine a user presence probability, and a transceiver configured to: receive a request for a user presence probability, send the user presence probability, and receive a communication.

Another aspect of the present invention may reside in an apparatus to receive a communication comprising: means for receiving a request for a user presence probability, means for determining a measured user-specific characteristic, means for comparing the measured user-specific characteristic to a stored user-specific characteristic, means for determining a characteristic-specific user presence probability, means for determining a user presence probability, means for sending the user presence probability, and means for receiving a communication.

Another aspect of the present invention may reside in a computer-readable storage medium comprising program code, to receive a communication, stored thereon, comprising code for: receiving a request for a user presence probability, determining a measured user-specific characteristic, comparing the measured user-specific characteristic to a stored user-specific characteristic, determining a characteristic-specific user presence probability, determining a user presence probability, sending the user presence probability, and receiving a communication.

Another aspect of the present invention may reside in a method of forwarding an incoming communication comprising determining a target user identification for the incoming communication, sending the target user identification to a plurality of destination devices, requesting a user presence probability associated with the target user identification from the plurality of destination devices, receiving the user presence probability from the plurality of destination devices, selecting a destination device based on a criteria comprising the user presence probability, and establishing a communication link to the destination device.

Another aspect of the present invention may reside in an apparatus to forward an incoming communication comprising: a processor configured to determine a target user identification for the incoming communication and select a destination device based on criteria comprising a user presence probability; and a transceiver configured to send the target user identification to a plurality of destination devices, request the user presence probability associated with the target user identification from the plurality of destination devices, receive the user presence probability from the plurality of destination devices, and establish the communication link to the destination device.

Another aspect of the present invention may reside in an apparatus to forward an incoming communication comprising means for determining a target user identification for the incoming communication, means for selecting a destination device based on criteria comprising a user presence probability, means for sending the target user identification to a plurality of destination devices, means for requesting the user presence probability associated with the target user identification from the plurality of destination devices, means for receiving the user presence probability from the plurality of destination devices, and means for establishing a communication link to the destination device.

Another aspect of the present invention may reside in a computer-readable storage medium comprising program code, to forward an incoming communication comprising code for determining a target user identification for the incoming communication, sending the target user identification to a plurality of destination devices, requesting a user presence probability associated with the target user identification from the plurality of destination devices, receiving the user presence probability from the plurality of destination devices, selecting a destination device based on a criteria comprising the user presence probability, and establishing a communication link to the destination device.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Figure 1:
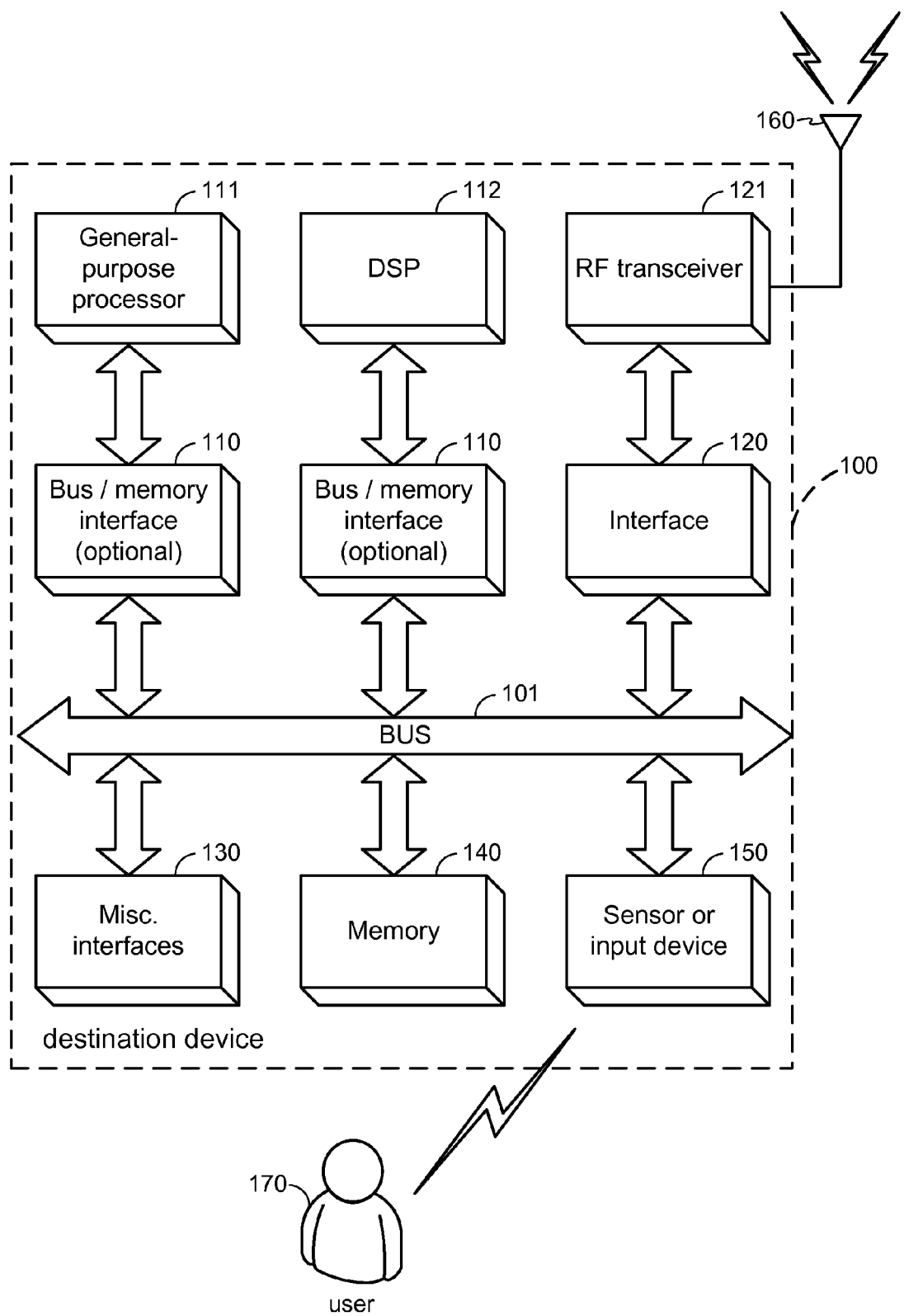
FIG. 1 shows an embodiment of a destination device.

As used herein, destination device 100 refers to a communications-capable device such as a voice-capable device, a text-capable device, a data device or a video-capable device. The communication may be comprised of text, voice, pictures, video, music, or some combination thereof. Other embodiments may be comprised of a combination of voice, text, data or video. FIG. 1 shows a block diagram of one embodiment of a destination device 100. The destination device 100 includes a general purpose processor 111 and a digital signal processor 112 interfaced to bus 101 through an optional bus/memory interface 110. Other embodiments may include different combinations of general and specialized computing resources, for example, including specialized processors such as graphics processors, audio processors, signal processors and global positioning system and satellite positioning system processors. The destination device 100 also includes memory 140 which may encompass but is not limited to multiple memory types such as RAM, ROM, FLASH and EPROM. At least one provides a means for interfacing to voice sessions, e.g. a VoIP session, over a common interface technology such as WiFi or Bluetooth. Various communication link protocols may be used between the Communication Forwarding Device or, in some embodiments, the telephone 340 or the mobile station 320, and the destination device 100 such as HTTP or UDP. In one embodiment, an HTTP protocol is used whereby the communication forwarding device 330 or, alternately, the telephone 340 or the mobile station 320, contacts the destination device 100 through a pre-configured network port. Note, in the art, a port is an application-specific or process-specific software construct serving as a communications endpoint used by transport layer protocols, TCP and UDP. In this embodiment, each destination device 100 has client software listening to the pre-configured port for incoming communication. The call session may be managed through various protocols such as H.323, Session Initiation Protocol (SIP), Media Gateway Control Protocol (MGCP), and Skinny Client Control Protocol (SCCP). Establishing a communication link to an incoming voice session may involve intervening devices such as an access point and/or a communications forwarding device. In other embodiments, additional RF transceivers 121 and miscellaneous interfaces 130 may be utilized to interface to other systems such as, but not limited to, a WAN (wide area) network, a PAN (personal area) network, a game system, a computer and the Internet. At least one sensor or input device 150 provides a means for receiving and measuring user-specific characteristics. Such sensors and input devices may include, but are not limited to, keyboards, push buttons, dials, accelerometers, altimeters, gyros, optical and camera sensors, fingerprint sensors, touch sensors, microphones, capacitive sensors and deflection sensors.

User presence probability is a probability that a particular user is utilizing a target destination device 100. At least one measured user-specific characteristic is used to determine a user presence probability. In one embodiment, a destination device 100 will receive a request for a user presence probability associated with a particular user. The destination device 100 compares each available measured user-specific characteristic to a corresponding stored user-specific characteristic. The results of the comparisons are used to determine an overall user presence probability for the user or users associated with the request. That user presence probability will be sent to the requesting entity, typically either the communication receiving device 200 or the communication forwarding device 330. If no user is using the destination device 100, a zero value or other notification that no user is using the destination device 100, may be sent to the communication forwarding device 330 or communication receiving device 200. It is recognized that the communication forwarding device 330 may, in some embodiments, also be integrated into the communication receiving device 200 such as the mobile device, while in other embodiments, intervening entities such as a discrete communication forwarding device 330 and a wireless router 315 or access point may be required.

In some embodiments, the destination device 100 will contain audio input and output capability. In other embodiments, the destination device 100 will contain text input and output capability. In still other embodiments both audio and text input and output ability will be supported in the destination device 100. In still other embodiments, the destination device 100 will be data-capable. These capabilities may be included as miscellaneous interfaces 130 in destination device 100. It is recognized that other means of communication such as camera and video may also be supported in some embodiments.

As used herein, mobile station (MS) refers to a device such as a cellular or other wireless communication device, personal communication system (PCS) device, personal navigation device (PND), personal information manager (PIM), personal digital assistant (PDA), laptop or other suitable mobile device which is capable of receiving wireless communication and/or navigation signals. Also, "mobile station" is intended to include all devices, including wireless communication devices, computers, laptops, etc. which are capable of communication with a server, such as via the Internet, WiFi, or other network, and regardless of whether communications processing occurs at the device, at a server, or at another device associated with the network. Other embodiments may include any operable combination of the above.

Figure 2:
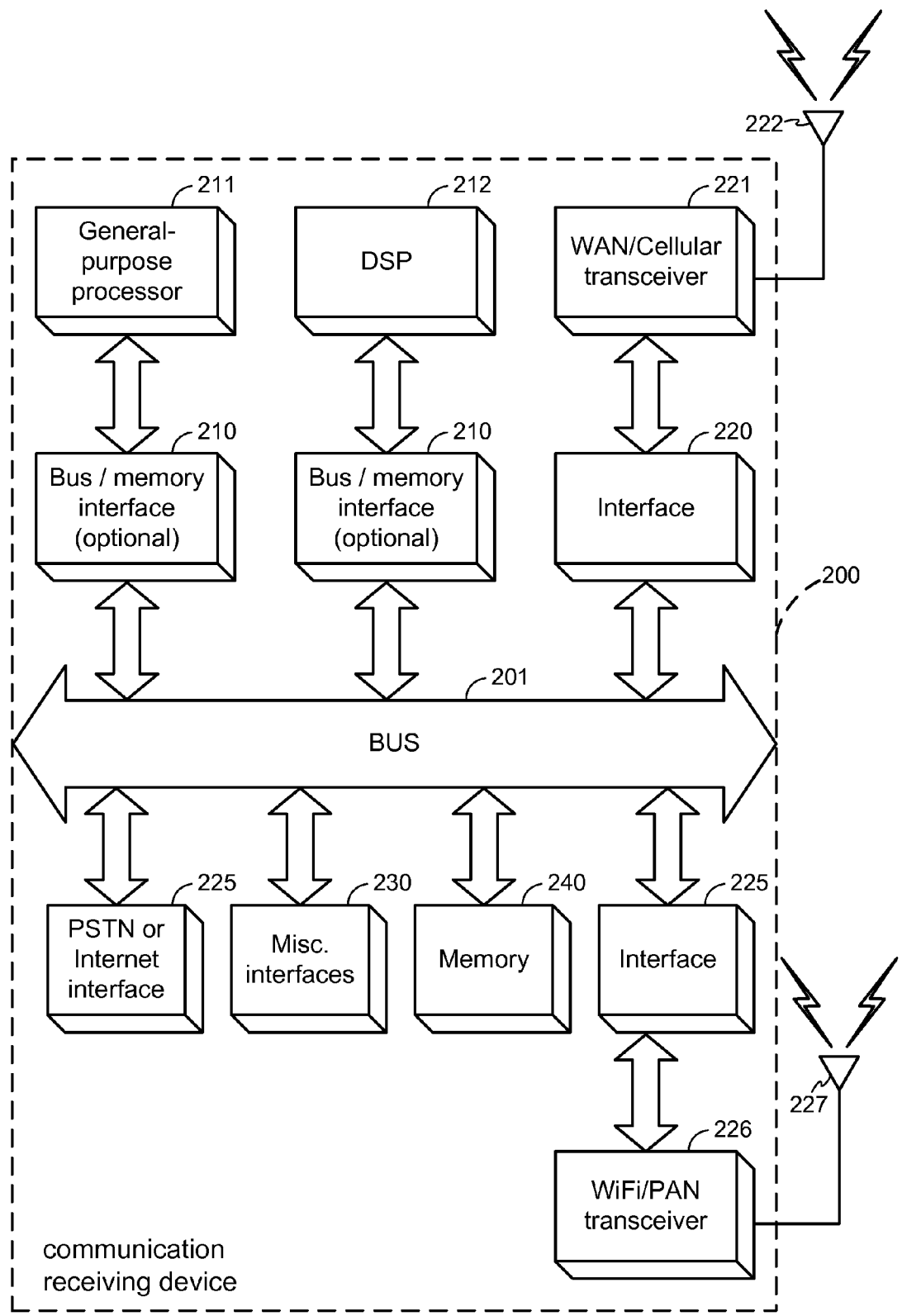
FIG. 2 shows an embodiment of a communication receiving device.

FIG. 2 shows a block diagram of one embodiment of a communication receiving device 200. The communication receiving device 200 receives communication, typically through a RF transceiver. In the pictured embodiment, the communication receiving device 200 has the ability to forward incoming communication received through the WAN/Cellular RF transceiver 221, WiFi/PAN RF 226, PSTN or Internet interface 225 or miscellaneous interface 230. The incoming communication may be forwarded through the WAN/Cellular RF transceiver 221, WiFi/PAN RF 226, PSTN or Internet interface 225 or miscellaneous interface 230. The incoming communication may be transcoded into different formats such as from analog voice or digitized voice format into other digitized formats such as voice over IP (VoIP) format. The communication receiving device 200 includes a processor 211 coupled, possibly through an optional bus/ memory interface 210 and a bus 201, to a DSP 212, a WAN/Cellular RF transceiver 221, PSTN or Internet interface 225, miscellaneous interface 230, memory 240 and a WiFi/PAN (personal area network) RF transceiver. Miscellaneous interfaces may include a voice/audio interface and a text interface. Other embodiments may include any operable combination of some or all of the above mentioned modules/interfaces or additional modules/interfaces.

The communication receiving device 200 also includes communication forwarding functionality. The communication forwarding functionality, in one embodiment, may be implemented as a software application. The communication management functionality may include but it is not limited to the ability to verify the user identification, for example via password, to determine and record an available destination device 100 and to control the routing of communication to a destination device 100. Also, if the communication receiving device 200 is used as a destination device 100, the communication management functionality would also include the ability to receive incoming communications, measure and report on user-specific characteristics, measure and report non-user-specific device data and determine if the user is currently using the communication receiving device 200.

It is recognized that the functionality found in the communication receiving device 200 is, in some embodiments, also applicable to and found within the telephone 340 or within the combination of the telephone 340 and the communication forwarding device 330.

Figure 3:
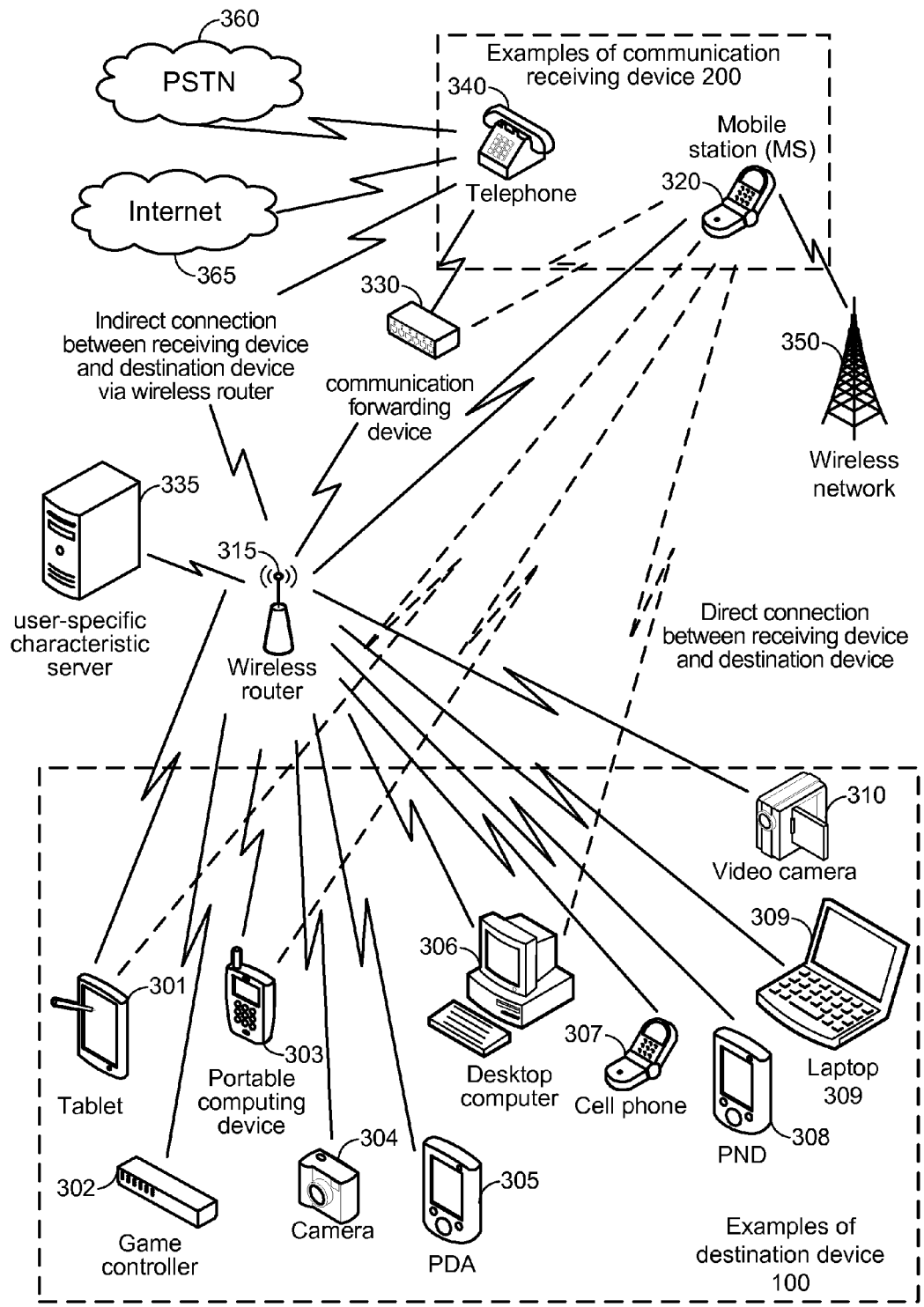
FIG. 3 shows a network diagram which includes several embodiments of communications routing.

FIG. 3 illustrates various embodiments of communications routing. In one embodiment, the incoming communication is received through a telephone 340 wherein the incoming communication arrives from a PSTN 360. In another embodiment, the incoming communication is received through a telephone 340 wherein the incoming communication arrives from the Internet 365. The incoming communication may be forwarded through various means to the intended caller, for example, indirectly through a communication forwarding device 330 to the destination device 100, indirectly through a communication forwarding device 330 to a wireless router 315 and then to the destination device 100, indirectly through a wireless router 315 or directly from the telephone 340 to the destination device 100. It is recognized that the means to receive communications, to determine which destination device 100 the user is at, to route wireless communication between the telephone 340 and the destination device 100, and to forward the incoming communication to the destination device 100 may be located in one or a combination of the telephone 340, the communication forwarding device 330 and the wireless router 315. In still other embodiments, other entities may perform these functions.

In another embodiment, the incoming communications is received through a mobile station 320 wherein the incoming communication arrives from a wireless network 350. The incoming communication may be forwarded through various means to the intended recipient, for example, indirectly through a communication forwarding device 330 to the destination device 100, indirectly through a communication forwarding device 330 to a wireless router 315 and then to the destination device 100, indirectly through a wireless router 315 or directly from the telephone 340 to the destination device 100. It is recognized that the means to receive communication, to determine which destination device 100 the user is at, to route wireless communication between the mobile station 320 and the destination device 100, and to forward the incoming communication to the destination device 100 may be located in one or a combination of the mobile station 320, the communication forwarding device 330 and the wireless router 315. In still other embodiments, other entities may perform these functions.

Communication between the communication receiving device 200, such as the telephone 340 and the mobile station 320, and the destination device 100 may be accomplished by network protocol. In one embodiment, the communication receiving device 200 polls all devices with assigned addresses on a wireless router 315 or access point by sending a message to a pre-assigned port number. Devices that respond to a message to the pre-assigned port number are available as destination device 100. The pre-assigned port number may be utilized for further communication including receipt of polling requests for user presence probability and non-user-specific device data. In some implementations, non-user-specific device data may be used to determine if a particular destination device 100 is in use or otherwise receptive to receiving communication. In other embodiments, the communication receiving device 200 may initiate direct peer to peer communication, for example, with WiFi, Bluetooth or other wireless personal area network protocols. The communications means, whether through a wireless router or through direct peer to peer communication, may be used to poll the destination device 100 for user presence probability information, non-user specific device data, usage or status information and to establish a communications session between the communications receiving device and at least a destination device 100 associated with the highest user presence probability for the target user identification associated with the incoming communication. It is recognized that other communications means known in the art may also be used to establish communications between the communication receiving device 200 and the destination device 100.

In some embodiments, a user-specific characteristic server stores measured user-specific characteristics associated with each user. These user-specific characteristics are accessible to and/or downloadable and uploadable by the destination device 100 and may be used to determine user presence probability as measured at each destination device 100.

FIG. 3 also illustrates a plurality of embodiments of destination device 100 including a communications-enabled tablet (301), a communications-enabled game controller (302), a communications-enabled portable computing device (303), a communications-enabled camera (304), a communications-enabled personal digital assistant (PDA, 305), a communications-enabled desktop computer (306), a communications-enabled laptop (309), a cell phone (307), a communications-enabled personal navigation device (PND, 308) and a communications-enabled video camera (310). This list of communications-enabled embodiments of the destination device 100 is not exhaustive. It is recognized that other embodiments of destination device 100 may include other communications-enabled wireless device beside those described above. It is also recognized that communications may comprise, but is not limited to voice, data, text or video.

FIG. 3 illustrates a communication forwarding device 330. In some embodiments, the communication forwarding device 330 polls the destination device 100. Each destination device 100 may respond to the poll from the communication forwarding device 330 with information comprised of the highest user presence probability estimate on that device and the user for which that probability is associated. The communication forwarding device 330 will forward a communication for a particular user to the destination device 100 that reports the highest user presence probability estimate for that user in the most recent poll, assuming that a predesignated threshold for an in-use condition is met or exceeded. The poll of devices may be conducted periodically or may be conducted on demand.

Alternately, if the highest user presence probability estimate on that device is not above a pre-designated threshold, a not in use status designator may be sent to the communication forwarding device 330 instead. The communication forwarding device 330 stores and manages the user presence probability data for each destination device 100 in addition to the time the poll was conducted. The stored data is comprised of the likely user, if any, the user presence probability data, a device identifier and the time of polling.

If a device does not respond to a poll, results from a prior poll may be considered in deciding what the current user presence probability is for that device, particularly in the absence of other devices reporting user presence probability estimates for the particular user above the pre-designated threshold. If all devices report that the current user presence probability is below a pre-designated threshold, the device with the highest user presence probability on the next most recent poll will become the target for forwarded communication. Assuming that the last used device is the most likely to be in proximity to the user, determining the destination device 100 with the highest user presence probability in the next most recent poll will result in attempted communication with the device most likely to be in close proximity to the user. In the absence of any current poll results reflecting high user presence probability results for a designated user, high user presence probability results from a prior poll may also be used to trigger an additional polling attempt to that device or may trigger a communication forwarding attempt to that device as if the high user presence probability results were current.

It is recognized that the functionality attributed to the communication forwarding device 330 and described above in conjunction with the communication forwarding device 330 may, in some embodiments, be subsumed into the communication receiving device 200 such as the telephone 340, the mobile station 320 or other communication receiving device 200. Also, recognize that the telephone 340 is defined to include any device that receives incoming communication, regardless of the format received, and is capable of forwarding that communication either through the communication forwarding device 330 to the destination device 100 or directly to the destination device 100. For example, the incoming communication may arrive via landline from the PSTN 360 or may arrive from the Internet 365 as a VoIP session and be forwarded either through the communication forwarding device 330 to the destination device 100 or directly to the destination device 100.

Some embodiments may include a user-specific characteristic server 335 that stores user-specific characteristic measurements from each destination device 100. The user-specific characteristic measurements may be stored individually per device to account for device-specific usage modes and constraints. Alternately, user-specific characteristic measurements such as typing speed may be shared or averaged between different devices to come up with a common typical value for a given user-specific characteristic. The user-specific characteristic server 335 may be used to collect and share user-specific characteristic information with the destination device 100.

Still other embodiments will store and manage the user-specific characteristic measurements for each user locally on the destination device 100. Each destination device 100 may, in some embodiments, poll other devices for stored user-specific characteristic data. This is particularly useful if a given user has not run a destination device 100 in learning mode and other devices are able to share pre-recorded user-specific characteristic measurements for the applicable modes of use. For example, typing rate or finger print data may be shared between multiple devices to avoid requiring that the user use each destination device 100 in learning mode.

In some embodiments, the communication forwarding device 330 or the communication receiving device 200, telephone 340 or mobile station 320, may directly combine data, including non-user-specific device data such as device state (on, off, charging, in use, time of last use, ambient light surrounding the device) with user-specific-characteristic measurement data from multiple devices to determine which destination device 100 the targeted user is using or last used. Some examples of non-user-specific device data include: time of last movement (e.g., as determined by an accelerometer or motion sensor), time of last use (for example, as determined by a key press); charging status (e.g., if the device is charging it is likely not being used); ambient light status (e.g., detected using an ambient light detector or a camera sensor to determine if device is in the dark); and application status (e.g., which games are being played, which apps are being used, or which email account is active). The non-user-specific device data may be combined from multiple devices via a set of pre-determined rules to determine which destination device 100 a user is using at any given time. For example, if the user's cell phone is in use, it is very likely that the user is on that cell phone. However, if the user's cell phone is charging in a stationary charger, it is unlikely that the user is using that cell phone. If a computer is in use and it is in Facebook, an analysis of the last login attempt or the language used may suffice to determine who is using the computer.

User-specific characteristic data may, in general, be more reliable than non-user-specific device data since it is associated directly with a given user. Different characteristics, however, may have differing reliability and user specificity. Combinations of multiple types of user-specific characteristic data or on user-specific characteristic data and non-user-specific device data may be used to enhance the reliability of determining who is using a particular device. An identification may be decided on the basis of a high confidence match for user-specific characteristic data such as a finger print match or a face recognition match. Alternately, a lower confidence match for user-specific characteristic data (for example, the user is wearing a hat or grew a mustache that is lowering the confidence of a face recognition identification) could easily be supplemented by other user-specific or non-user specific techniques. Examples of user-specific characteristic data include typing rate; face characteristics (e.g., head size) or the results of face recognition (using a camera to measure user characteristics); voice recognition; biological characteristics (e.g., blood pressure, finger prints, hand temperature, skin conductivity, electro-encephalograph measurements (EEG), finger size (for example, as measured by activation area on touch screen LCD); hand size (for example, as measured by capacitive proximity sensors around the bezel of device); hand or body movements, login status, active software, retina-based identification, walking gait or tremors (as measured by accelerometers); head size detection or face recognition (using inward facing camera); typing rates and key stroke patterns or word use analysis.

Some user-specific characteristics such as face recognition or retinal patterns may be sufficient to identify the user without other characteristics. Other user-specific characteristics such as typing speed may be best used in combination with other characteristics. The probability that a user is using a particular device is determined by calculating a user presence probability. A user presence probability is determined by combining available characteristic-specific user probabilities. A characteristic-specific user presence probability is calculated by comparing a measured user-specific characteristic to a stored user-specific characteristic and calculating a variance of the measured user-specific characteristic from the stored user-specific characteristic. The variance of the measured user-specific characteristic from the stored user-specific characteristic may be calculated by means known in the art such as through statistical probability, relative difference, and difference from expected distribution.

If a plurality of user-specific characteristics is measured, a plurality of corresponding characteristic-specific user probabilities is calculated. The user presence probability is derived from the combination of available characteristic-specific user probabilities. The characteristic-specific user presence probability may be combined by various means to calculate the user presence probability. For example, the user presence probability may be a mean of the characteristic-specific user probabilities, a weighted mean of the characteristic-specific user probabilities, a median of the characteristic-specific user probabilities, or a mean of the characteristic-specific user probabilities with outliers discarded. If there is only one characteristic-specific user presence probability, the user presence probability equals the characteristic-specific user presence probability. Also, more reliable user-specific characteristics may be weighted heavier than less reliable user-specific characteristics. For example, a finger print match might be weighted very high resulting in a high characteristic-specific user presence probability while a typing rate match might be weighted lower resulting in a more moderate characteristic-specific user presence probability.

In another embodiment, the characteristic-specific user presence probability is determined to be a match if the measured user-specific characteristic is within a reasonable variance of the stored user-specific characteristic. If there are multiple measured user-specific characteristics, they may be combined by various means such as through a polling function (majority vote) to determine the value of the user presence probability. Alternately, a match condition may be assigned a value (e.g., one) and a non-match condition may be assigned a different value (e.g., zero) and the values averaged. The threshold for a match may be adjusted depending on the environment. Thus, the threshold for a match could be set relatively low in a private home environment since there is a lower chance of false positive matches but the threshold would be set higher in a more public environment such as an office building where there is a higher chance of a false positive match.

It is also recognized that, in some embodiments, if the user is not present on any of the destination device 100 or fails to acknowledge the incoming communication, the incoming communication may, in some embodiments, be forwarded to a device in a different location (e.g. home versus office) via the wireless network 350, PSTN 360 or Internet 365 or be forwarded to an answering machine, voice mail or a message inbox.

In some embodiments, determination of the target user identification associated with an incoming communication, e.g. the intended recipient for an incoming communication, is accomplished on the communication receiving device 200. Thus, in FIG. 3, the telephone 340 and the mobile station 320 may determine the target user identification. If the incoming communication is initially received at a dedicated mobile station 320 or dedicated telephone 340, the target user identification may be assumed to be based upon the owner of the mobile station 320 or dedicated telephone 340. Another means to determine the target user identification associated with an incoming communication includes using caller identification information to determine the most likely target user identification. Still another means to determine the target user identification associated with an incoming communication comprises utilizing target user identification information associated with the incoming communication. For example, an incoming email, text message or Internet chat session is generally addressed to a particular target user identification.

Still another means to determine the target user identification is to request a reply from a destination device 100 in response to a query associated with the incoming communication. The query associated with the incoming communication may include caller identification information, if available, and a given user may proactively decide to accept the communication. This can be in the form of a user request for communication forwarding, for example, in the form of a soft key selection or other device input. In some embodiments, incoming communication without an associated target user identification may be automatically forwarded to voice mail, answering machine or other automated response.

Figure 4:
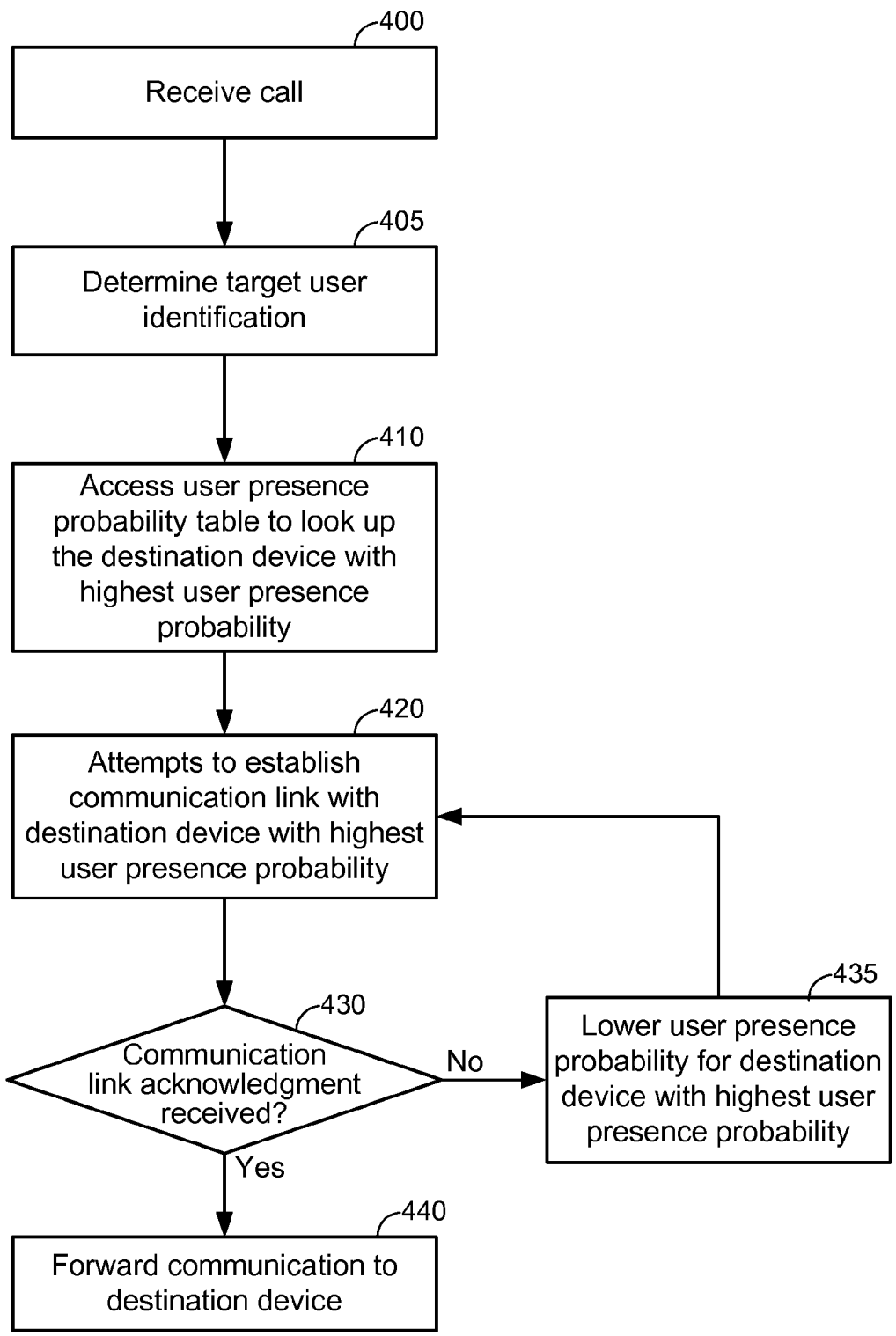
FIG. 4 shows a method of communication forwarding utilizing pre-polling of destination device.

FIG. 4 illustrates an embodiment of a communication forwarding procedure with pre-polling. FIG. 4 applies to embodiments with pre-polling of the destination device 100 by either the communication forwarding device 330 or, where no communication forwarding device 330 is present, by the communication receiving device 200 (e.g., the telephone 340 or the mobile station 320). The communication forwarding procedure with pre-polling involves the following steps.

The call is received in Step 400 by a communication receiving device 200 such as a telephone 340 or a mobile station 320.

In Step 405, the target user identification is determined. The target user identification is based upon the user for which the communication is intended. For textual communication, the target user identification is based upon the user to whom the communication is addressed. For voice communication, the target user identification may be based upon the person to whom the communication receiving device 200 is assigned (for example, a cell phone's owner). Alternately, if there are multiple users of a communication receiving device 200, the target user identification may be actively determined. For example, the target user identification may be determined by mapping the caller identification to a particular target user identification via historical call data or user pre-configuration. The target user identification may also be determined by querying the caller or other communication initiator for the intended target user identification.

In Step 410, the communication forwarding device 330 or the communication receiving device 200 (e.g., the telephone 340 or the mobile station 320) accesses a user presence probability table to look up the destination device with the highest user presence probability for the target user identification. The device with the highest user presence probability for the target user identification is assumed to have the highest likelihood of the user associated with the target user identification being present on the selected destination device 100. In this embodiment, the user presence probability table consists of a table of information including available target devices, registered users for each device, the user presence probability associated with each registered user of each available target device, and the time that the probability of each registered user of each available target device was determined. Other embodiments may contain different or additional fields. The communication forwarding device 330, if present, or the communication receiving device 200 (e.g., the telephone 340 or the mobile station 320) pre-populates the user presence probability table during periodic polls of each destination device 100, thereby allowing the communication forwarding device 330, if present, or the communication receiving device 200 (e.g., the telephone 340 or the mobile station 320) to more efficiently process incoming communication without added polling latency.

In Step 420, the communication forwarding device 330, if present, or the communication receiving device 200 (e.g., the telephone 340 or the mobile station 320) attempts to establish a communication link with the destination device 100 with the highest user presence probability associated with the target user identification. Embodiments of the communications link include, but are not limited to a direct peer-to-peer link via a short range wireless technology such as blue tooth or WiFi, an indirect link via a wireless access point or router, or a WAN link. It is realized that other communication links known in the art may be supported.

In Step 430, if a communication link acknowledgement is received in response to Step 420, designating that the user of the selected destination device 100 acknowledges and is willing to accept the communication link request, the communication is, in Step 440, forwarded to the selected destination device 100.

In Step 430, however, if a communication link acknowledgement is not received, a working assumption is made that the user associated with the target user identification is not at the device with the highest user presence probability for that target user identification. The user presence probability table is accessed and the user presence probability for the target user identification associated with the device currently showing the highest user presence probability for that target user identification is lowered below the preset threshold. This allows the next highest user presence probability to become the highest user presence probability allowing the communication link to be attempted at a new device. This process continues until a successful communication link is made, until all devices that have the target user identification registered have been tried, or until the forwarding attempt times out and forwards to voice mail or other communication storage. The communication forwarding device 330 or the communication receiving device 200 (e.g., the telephone 340 or the mobile station 320) will, in Step 420, then attempt to establish communication link with a destination device 100 with the next highest user presence probability. If no response is obtained, this cycle will repeat until no destination device 100, having the target user identification registered on it, remains with a user presence probability above the preset threshold.

Figure 5:
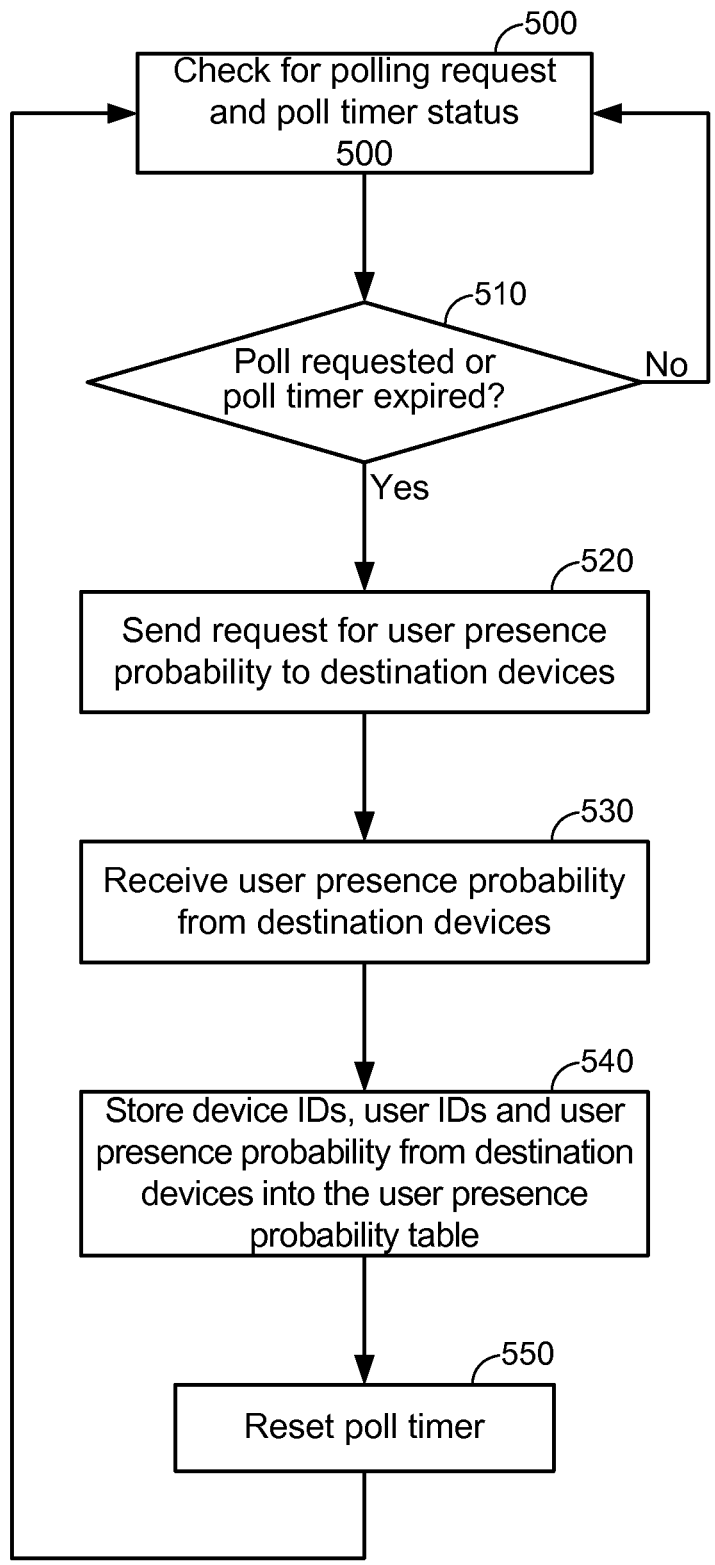
FIG. 5 shows a method of pre-polling destination device.

FIG. 5 illustrates one embodiment of a destination device Pre-Polling Procedure. A pre-polling procedure is used to populate the user presence probability table. The user presence probability table consists of a table of information including available target devices, registered users for each device, the user presence probability associated with each registered user of each available target device, and the time that the probability of each registered user of each available target device was determined. The user presence probability table will be filled for all responding destination device 100, enabling the user presence probability for any registered user to be looked up in the user presence probability table on demand. This pre-polling procedure enables direct lookup of user probabilities on each device when a new communication is received and avoids delaying incoming communication while the destination devices are being polled.

In Step 500, the communication forwarding device 330 or the communication receiving device 200 (e.g., the telephone 340 or the mobile station 320), checks for a poll request and for poll timer status. In Step 510, if a poll has been requested in response to an incoming communication or if the poll timer has expired, a poll will be initiated in Step 520. If a poll has not been requested and if the poll timer has not expired, the status will continue to be periodically checked. It is known that the polling loop of Steps 500 and 510 could be replaced by an interrupt scenario triggered by both poll requests and by timer status.

In Step 520, the communication forwarding device 330 or the communication receiving device 200 (e.g., the telephone 340 or the mobile station 320), initiates a poll by sending a request to the destination device 100 for information comprised of the identification of the destination device 100, registered users for the destination device 100, the user presence probability associated with each registered user for destination device 100, and the time that the probability of each registered user was determined. The communication forwarding device 330 or the communication receiving device 200 may also request device status from the destination device 100. The device status may be based on non-user specific information comprising whether the device is being charged, whether the device is face down, when a device was last moved or used, and whether a device is in use.

In Step 530, the information comprising the identification of the destination device 100, registered users for the destination device 100, the user presence probability associated with each registered user for destination device 100, the time that the probability of each registered user was determined and device status is received by the communication forwarding device 330 or the communication receiving device 200 (e.g., the telephone 340 or the mobile station 320) which, in Step 540, stores this information into a user presence probability table. The user presence probability table may be used to determine which destination device 100 to forward incoming communication to as illustrated in the embodiment described in FIG. 4.

In Step 550, the poll timer is reset and is used to trigger a new poll after a preconfigured time elapses.

Figure 6:
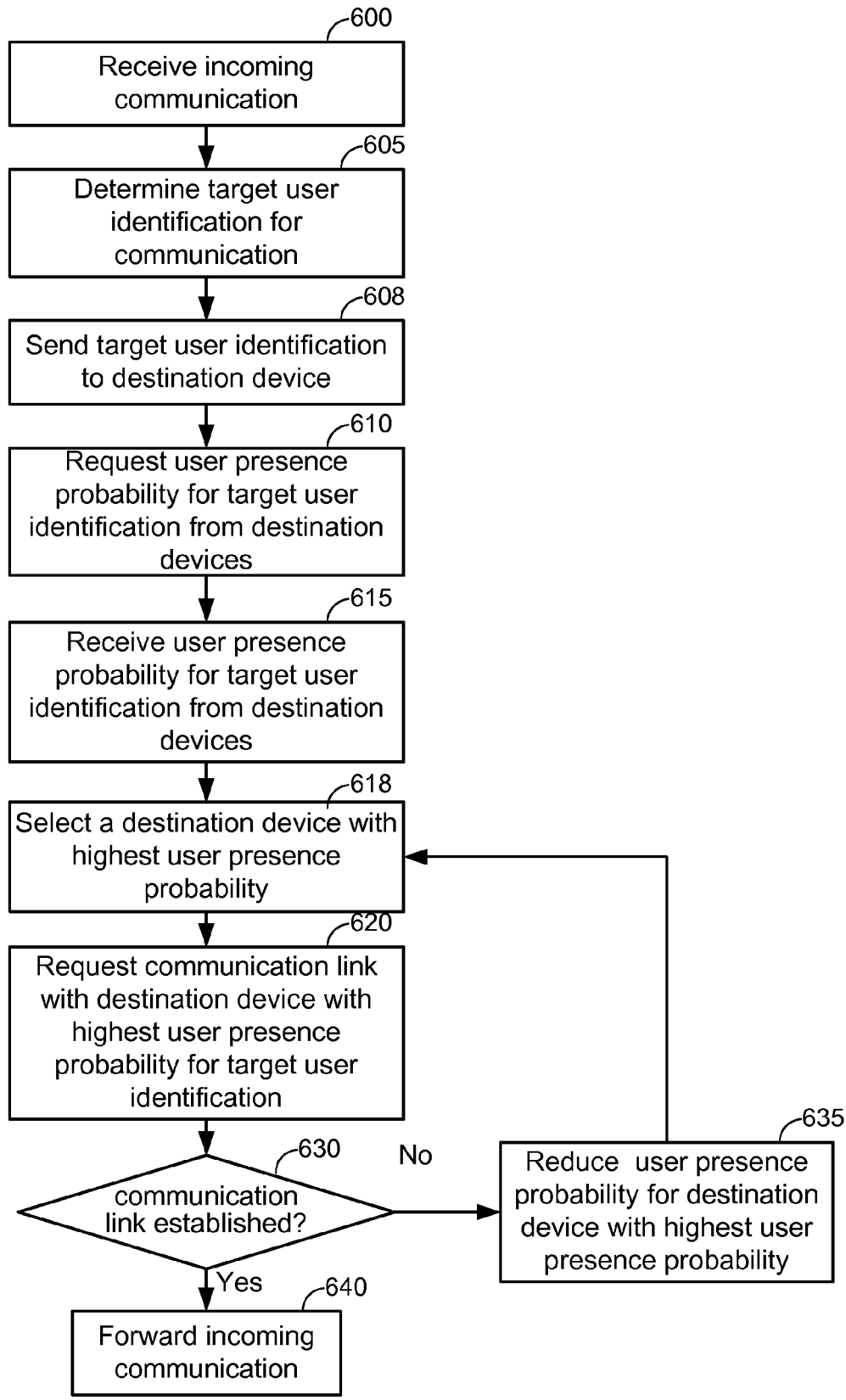
FIG. 6 shows a method of communication forwarding without utilizing pre-polling of destination device.

FIG. 6 illustrates an embodiment of a communication forwarding procedure without pre-polling. In this embodiment, polling of the destination device 100 is done in response to a received communication. The advantage of this embodiment is that the highest user presence probability associated with each device is determined on demand and is therefore more likely to be fresh. The cost of polling on demand is extra delay in the call forwarding process relative to a pre-polling implementation.

In Step 600, an incoming communication is received at a communication receiving device 200 (e.g., the telephone 340 or the mobile station 320). Steps 605, 610, 620, 630, 635 and 640 may be performed on the communication receiving device 200 if the communication receiving device is responsible for forwarding incoming communication directly to the destination device 100. Alternately, Steps 605, 610, 620, 630, 635 and 640 may be performed on the communication forwarding device 330 if incoming communication is being forwarded through the communication forwarding device 330 to the destination device 100. In Step 605, the target user identification for the incoming communication is determined. This may be accomplished by various means including, but not limited to, setting the target user identification to be equivalent to the default user identity (e.g., typically the owner) of the communication receiving device 200; determining the identification of the sender of the communication (e.g., through caller identification associated with the incoming communication or message header associated with the incoming communication) and determining the target user identification most often associated with the sender of the communication; or extracting the target user identification from addressing information associated with the incoming communication (e.g., the text or header of text-based communication such as via looking at the "To" line in an email header or the addressee line in a text communication).

In Step 610, the identity of the target user identification is sent to the destination devices 100 along with a request for the user presence probability associated with the target user identification on each destination device 100 on which the target user identification is registered.

In Step 615, the user presence probability associated with the target user identification, the time and date of measurement, and the identification of the responding destination device 100 are received by either the communication receiving device 200 or the communication forwarding device 330 (e.g., the device originating the request in Step 610). In some embodiments, the communication forwarding device 330 or the communication receiving device 200 may request and/or the destination device 100 may send device status such as when a device was last moved or used, whether a device is currently charging, and whether a device is in use. Destination devices (e.g. destination device 100) with a device status that indicates that they are not in use may be ignored in determining which of the destination devices to forward incoming communication to.

In Step 618, the user presence probability received from each destination device 100, for the target user identification, is compared and the destination device 100 associated with the highest user presence probability is selected as the target of the request in step 620.

In Step 620, a communication link is requested from the communication receiving device 200 or the communication forwarding device 330 to the selected destination device 100 with the highest user presence probability for the target user identification (above a preset threshold). If the communication link request is acknowledged, in Step 630, the incoming communication is forwarded to the selected destination device 100 as shown in step 640. If the communication link request is not acknowledged, the user presence probability for the destination device 100 with the highest user presence probability is reduced below a threshold value (thereby designating that the user associated with the target user identification is not at that destination device 100), in Step 635, and a new communication link request, in step 620 is issued to the destination device 100 with next highest user presence probability above the threshold value. Steps 620, 630 and 635 continue until either a communication link acknowledgment is received and the communication is forwarded or no destination device 100 has a user presence probability above the preset threshold. If no destination device 100 has a highest user presence probability above the preset threshold, the incoming communication will be forwarded to alternative means for addressing the communication comprising, but not limited to, an answering machine, voice mail, inbox or another device off the wireless network.

The communication link may be established directly between the communication receiving device 200 and the selected destination device 100 having the highest user presence probability for the target user identification for the incoming communication or the communication link may be established through intermediary devices such as a communication forwarding device 330 and a wireless router 315.

Figure 7:
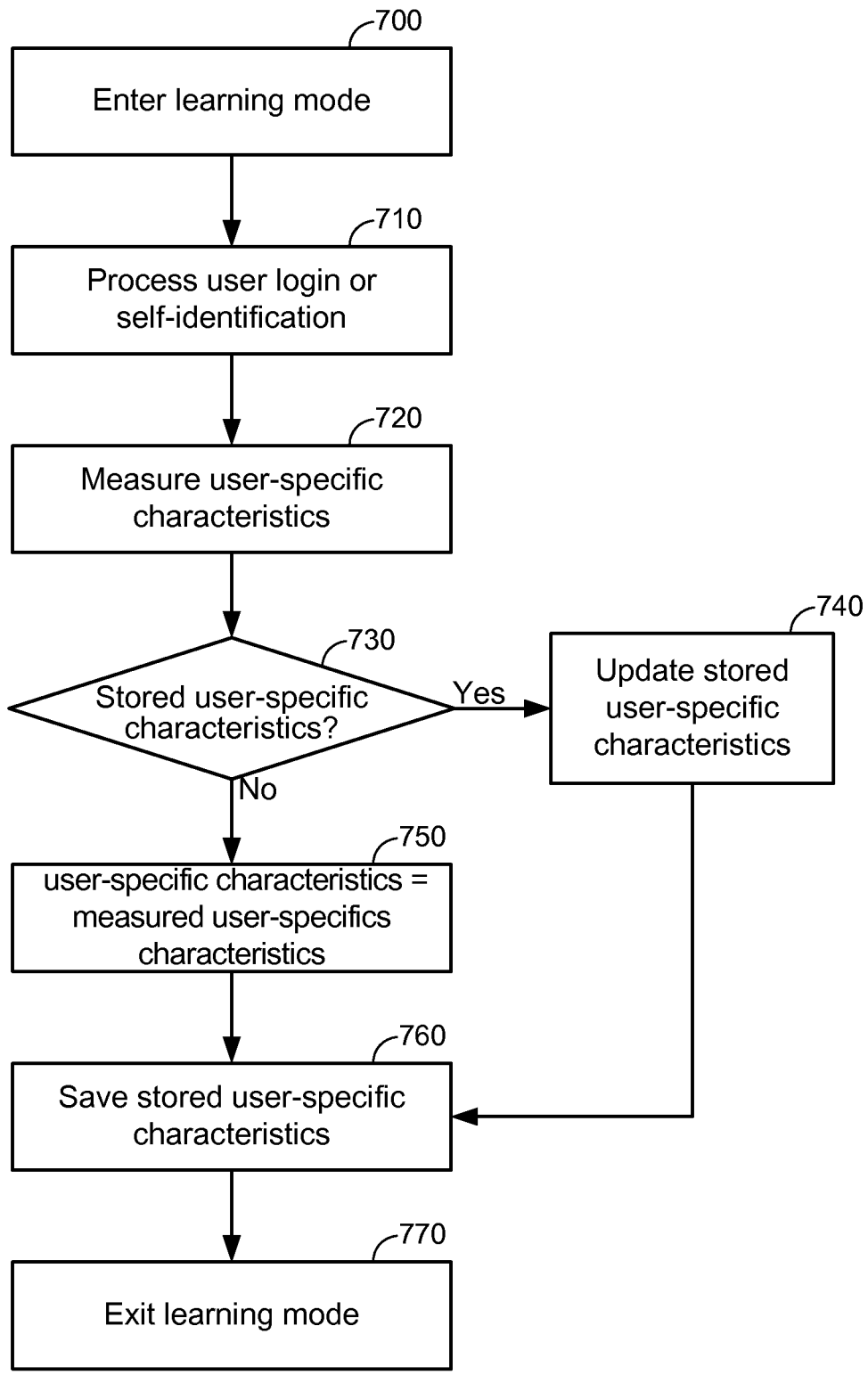
FIG. 7 shows a method to learn a user-specific characteristic in association with a user of a destination device.

FIG. 7 illustrates a learning mode used to measure a user-specific characteristic that may be stored (e.g., the stored user-specific characteristic) and compared to a subsequently measured user-specific characteristic (e.g., the measured user-specific characteristic) to determine a characteristic-specific probability for users of the destination device 100. The learning mode may be implemented on destination device 100. destination device 100 may also utilize a stored user-specific characteristic from other enabled destination device 100. In some embodiments, sharing of stored user-specific characteristic information between various destination devices (e.g., destination device 100) may be accomplished through a user-specific characteristic server 335. Regardless of whether the user-specific characteristic is stored on the destination device 100 or on a user-specific characteristic server 335, each stored user-specific characteristic is associated with a verified user identification. Thus, each verified user identification may have a set of user-specific characteristics associated with it. The association is created during learning mode where each stored user characteristic is input during a learning mode and is associated with a verified user identification. For example, the user may log into or otherwise authenticate with the destination device 100 and then initiate learning mode on the destination device 100. The destination device 100 will measure user-specific characteristics and store them for use in determining characteristic-specific user presence probability by the destination device 100 for the associated verified user identification. One embodiment of a learning mode is detailed in FIG. 7 as described below.

In Step 700, learning mode is entered on the device. In some embodiments, this is accomplished by the user purposely invoking a learning mode while in other embodiments, this may be done automatically.

While in learning mode, the user, the user logs in or otherwise self-identifies to the device as shown in step 710. This allows the association between measured user-specific characteristic information and a given user identification.

In Step 720, the destination device 100 measures a user-specific characteristic while the user uses the destination device 100. The measured user-specific characteristic may be stored on the destination device 100 or may be centrally stored at a user-specific characteristic server 335.

In Step 730, the destination device 100 checks to see if there are prior user-specific characteristics stored for the current user of the device.

In Step 740, if there are prior user-specific characteristics for the current user of the device stored, the newly measured user-specific characteristics are merged with the stored user-specific characteristics for the current user of the device. Various means can be used to merge the two sets of data including means, weighted means, replacement of outliers, or keeping the most recent values.

Alternately, if Step 750, if there are no stored user-specific characteristics for the current user of the device, the newly measured user-specific characteristics define the user-specific characteristics for the current user of the device.

In Step 760, the destination device 100 stores the new or modified user-specific characteristics into Memory 140. It is understood that Memory 140 may comprise volatile memory, non-volatile memory, external memory, removable memory devices or any combination of the above.

In Step 770, the destination device 100 exits learning mode. In some embodiments, exiting learning mode may be triggered automatically after collecting a pre-specified amount or duration of user-specific characteristic measurements. In other embodiments, exiting learning mode may be triggered automatically after determining user-specific characteristics or characteristic ranges and variables to a pre-determined level of certainty. In still other embodiments, exiting learning mode may be in response to input received from the user.

Figure 8:
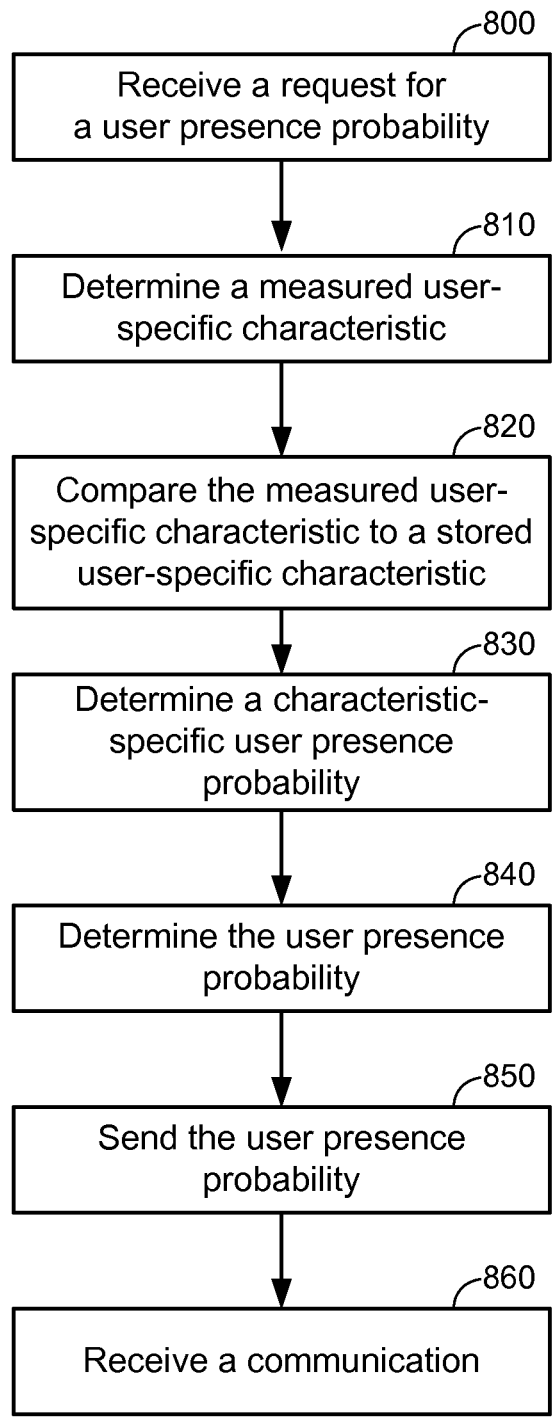
FIG. 8 shows a method to receive a communication.

FIG. 8 illustrates a method of receiving a communication at a destination device 100. In this embodiment the destination devices (e.g. destination device 100) report a user presence probability for a requested target user identification. A communication for the target user identification is forwarded by either the communication receiving device 200 or communication forwarding device 330 to the destination device 100 that reports the highest user presence probability for the target user identification. The user presence probability is a measure of the likelihood that the user associated with a given target user identification is currently utilizing the destination device 100 based on a comparison between various measured user-specific characteristics and the corresponding stored user-specific characteristics.

In Step 800, the destination device 100 receives a request for a user presence probability for a target user identification from either the communication receiving device 200 or the communication forwarding device 330. The request includes the target user identification for an incoming communication.

In Step 810, the destination device 100 determines a measured user-specific characteristic. For example, the destination device 100 might determine a typing rate or the head size of the current user of destination device 100. In some embodiments, a plurality of user-specific characteristics are measured. Examples of measured user-specific characteristic may include but are not limited to the group consisting of typing rate, face characteristic, face recognition, voice recognition; blood pressure, finger print, hand temperature, skin conductivity, electro-encephalograph readings, finger size, hand size, body movements, login status, active software, retina pattern, walking gait, body tremors, head size, typing rates, key stroke patterns or word use.

In Step 820, the measured user-specific characteristic is compared to a stored user-specific characteristic. Typically, the stored user-specific characteristic was stored and/or updated during learning mode as described in FIG. 7. In embodiments where a plurality of user-specific characteristics are measured, each measured user-specific characteristic is compared to its corresponding stored user-specific characteristic.

In Step 830, for each measured trait, a characteristic-specific user presence probability, a measure of closeness of the measured user-specific characteristic to the stored user-specific characteristic, is determined. The characteristic-specific user presence probability is determined by comparing the measured user-specific characteristic to the corresponding stored user-specific characteristic and calculating the closeness of the match between the measured user-specific characteristic and the corresponding stored user-specific characteristic corresponding to the target user identification.

In some embodiments, the determination of the characteristic-specific user presence probability is also based, at least in part, on the expected variability for the corresponding user-specific characteristic, i.e., by determining the likelihood of the measured degree of variation from the stored user-specific characteristic. For example, a password must be exact. However, the heart rate of a given user is likely to vary quite a bit. Head size, on the other hand, or facial features are likely to be relatively stable, reliable characteristics.

In some embodiments, the closeness of the measured user-specific characteristic to the stored user-specific characteristic for non-target users that have stored user-specific characteristics on the device may also be taken into account. Thus, if there are 6 registered users that type at approximately 30 words a minute, a measured user-specific characteristic value for a typing rate of 30 words a minute provides low confidence relative to which of the 6 users is using the device. In such a situation, the results of the comparison of the measured user-specific characteristic to the stored user-specific characteristic for the low confidence trait (e.g., typing in this example) will be downweighted or, in some embodiments ignored, in favor of utilizing comparisons of the measured user-specific characteristic to the stored user-specific characteristic for traits that are more uniquely differentiated between the registered users such as head size, password or facial characteristics as mentioned above.

Various means may be used to calculate the characteristic-specific user presence probability. For example, the stored user-specific characteristic may include statistical information regarding the likelihood of differing amounts of variance from the stored user-specific characteristic. This may be generic data on typical variation from use to use for a particular measured trait or it may be user-specific data collected regarding typical variation from use to use on the destination device(s). In this embodiment, the characteristic-specific user presence probability is based on the estimated probability of a measurement being at the determined variance between the measured user-specific characteristic and the stored user-specific characteristic. Other embodiments may utilize other methods of calculating the probability of a match between the measured user-specific characteristic and the stored user-specific characteristic.

In Step 840, the characteristic-specific user presence probability for each measured user-specific characteristic is combined to calculate a user presence probability. The user presence probability is an overall estimate that the user associated with the target user identification is using the destination device 100. If there is only one measured user-specific characteristic, the characteristic-specific user presence probability determined for that measured user-specific characteristic may be used as the user presence probability.

If there are multiple measured user-specific characteristics, the plurality of characteristic-specific user probabilities that result from the measured user-specific characteristics can be combined to calculate the user presence probability for the target user identification sent to the destination device 100 in the request for user presence probability. For example, the user presence probability could be determined based upon the highest characteristic-specific user presence probability based upon a comparison of the characteristic-specific user presence probability values from each measured user-specific characteristic measured for a given target user.

In another embodiment, the user presence probability could be determined based upon the median characteristic-specific user presence probability based upon the characteristic-specific user presence probability values from each measured user-specific characteristic measured for a given target user identification. In still another embodiment, the user presence probability could be determined based upon the mean characteristic-specific user presence probability based upon the characteristic-specific user presence probability values from each measured user-specific characteristic measured for a given target user identification. It is recognized that calculating the user presence probability based upon the mean characteristic-specific user presence probability also includes embodiments utilizing a weighted mean and utilizing a mean with outliers discarded.

In some embodiments, if the measured user-specific characteristic measured for a given target user is similar to or non-differentiable from the measured user-specific characteristic measured for a other users of the destination device 100, that measured user-specific characteristic and any characteristic-specific user presence probability that may be derived from it may be ignored or discarded in favor of using other more differentiable measured user-specific characteristics, regardless of the characteristic-specific user presence probability that might otherwise be obtained. In this circumstance, the plurality of characteristic-specific user probabilities utilized to calculate the user presence probability will not include characteristic-specific user probabilities which indicate more than one user (e.g., do not uniquely identify one user as the current user of the device).

In Step 850, the destination device 100 sends the user presence probability for the target user identification associated with the request for user presence probability to the communication receiving device 200 or, if an indirect connection is used, to the communication forwarding device 330.

In Step 860, if the user presence probability for the target user identification that was sent, was the highest user presence probability received, by the communication receiving device 200 or by the communication forwarding device 330, from the destination devices (e.g., destination device 100), the communication receiving device 200 or the communication forwarding device 330 will forward the communication to the destination device 100. If the user fails to acknowledge the communication on the destination device 100, the communication receiving device 200 or the communication forwarding device 330 will attempt to forward the communication to the next more likely destination device 100.

It is recognized that the communication may be of various forms including, but not limited to, text, voice, pictures, video, or music.

In some embodiments, the communication forwarding device 330 or the communication receiving device 200 may also request device status from the destination device 100. The device status may be based on non-user specific information comprising whether the device is being charged, whether the device is face down, when a device was last moved or used, and whether a device is in use. In these embodiments, the destination device 100 sends a device status to the communication receiving device 200 or to the communication forwarding device 330.

In some embodiments, the invention may be implemented utilizing client software installed on the communication receiving device 200 (e.g., telephone 340 or mobile station 320) and the destination device 100 (e.g., Tablet 301, game controller 302, portable computing device 303, camera 304, PDA 305, desktop computer 306, cell phone 307, PND 308, laptop 309 and video camera 310). The communication receiving device 200 receives incoming communication and forwards it either directly to the destination device 100 or through a communication forwarding device 330 to the destination device 100. The communication forwarding device 330 is a device that polls a plurality of destination device 100 to determine which user, if any, is associated with each destination device 100. The communication forwarding device 330 is contacted by the communication receiving device 200 when there is incoming communication on the communication receiving device 200. The communication forwarding device 330 establishes the communications link between the communication receiving device 200 and the destination device 100. In embodiments both with and without a communication forwarding device 330, a sample process of forwarding communication from the communication receiving device 200 to the destination device 100 with the highest user presence probability for the target user identification is described in FIGS. 4, 5 and 6. Incoming communication may be comprised of, but is not limited to, incoming text, SMS, emails, and multi-media messaging. It is recognized that this is one of many embodiments.

In some embodiments, a user-specific characteristic server 335 captures user-specific characteristic data and manages user accounts. The user-specific characteristic server 335 may be a remote network or on a local network. In embodiments where a user-specific characteristic server is present, each destination device 100 collects user-specific characteristics and forwards the user-specific characteristics to the user-specific characteristic server 335 where they are identified by user and managed for future reference. In embodiments where a user-specific characteristic server is not present, each destination device 100 collects, stores and manages user-specific characteristics directly. In some embodiments, the destination device 100 may require a password or other access permission to install client software and to utilize the device. The client software on the communication forwarding device 330 or the communication receiving device 200 may utilize a unique user identification and password for each user to control where and under what conditions each users' communication should be forwarded.

Forwarding conditions may comprise, but are not limited to, the confidence of a user identification on the destination device 100, the priority of the communication, the source of the communication, the activity being pursued on the destination device 100, the state of the destination device 100, time of day and the location of the destination device 100.

A list of destination devices (e.g., destination device 100) may be designated as acceptable to forward communication to. The designation of acceptable destination devices may be determined automatically by scanning for available destination devices in range of the communication forwarding device 330 or, if forwarding of communication is done directly by the communication receiving device 200, by scanning for destination devices in range of the communication receiving device 200. In another embodiment, registration of the destination device 100 with the communication forwarding device 330 and/or the communication receiving device 200 is triggered by execution of learning mode (FIG. 7) on the destination device 100.

In another aspect, a list of acceptable destination devices may be pre-specified. For example, the user may review a list of available destination devices and pre-determine which of them the user wishes to receive calls on and under which circumstances. In other embodiments, the user may also specify addresses of acceptable destination devices, for example, by IP address or phone number. The list of acceptable destination devices and destination device addresses to forward communication to for a given user is stored and managed on the device that forwards the communication, e.g., the communication receiving device 200 and/or the communication forwarding device 330, as appropriate.

In yet another aspect, a destination device 100 may contain a list of communication receiving devices (e.g., communication receiving device 200) that are allowed to forward communication to the destination device 100. The list of allowed communication receiving devices may be provided via user input or may be automatically determined based on user-specified criteria and logical combinations of user-specified criteria. For example, the list of communication receiving devices could be all cell phones used/owned by user X. Another example is phones and computers in range of the communication forwarding device 330 between the hours of 5 pm and 10 pm but only cell phone Y if time is not between the hours of 5 pm and 10 pm. Some embodiments may allow different communication forwarding logic based upon the type of incoming communication. Thus, a first destination device 100 may only allow text messages and graphics while a second destination device 100 may allow text messages and voice communication. Some embodiments may utilize different communication forwarding logic for different communication target user identifications and/or for different sources of the communication (e.g., all communication from the boss is forwarded to all capable destination devices but communication from a friend is only forwarded to wireless handsets).

In embodiments where communication forwarding is limited as described above, the communication forwarding devices (e.g., communication forwarding device 330), communication receiving devices (e.g., communication receiving device 200) and destination devices (e.g., destination device 100) may, as described above, track the identification and address of the devices they are capable of forwarding communication to or receiving communication from. In networks where addresses are dynamically determined, e.g., DHCP systems or other dynamic address allocation systems, the communication forwarding devices, communication receiving devices and destination devices may automatically update stored addresses to reflect the current address of devices connected to it. Alternately, when devices such as the communication forwarding devices, communication receiving devices and destination devices are allocated a new address, they may notify connected devices of the need to update their associated address. In still further embodiments, the data showing which other devices each device is allowed to receive information from or forward information to may be stored in a shared server such as the user-specific characteristic server 335.

In some embodiments, the destination device 100 supports a learning mode (e.g., FIG. 7). During learning mode, a user of destination device 100 logs onto or otherwise self-identifies to the destination device 100. The destination device 100 captures user-specific characteristic data and associates it with the identified user based on the login or other self-identification data. If there is prior user-specific characteristic data, that data may be refreshed and updated based on new data collected during learning mode. The user-specific characteristic data may be specific to the destination device 100 it is measured on. For example, the user may have a different typing rate on two different destination devices with different form factors. Alternately, the user-specific data may be common across multiple destination devices. Whether the user-specific data is different or common across different destination devices may be determined after learning mode has been operated by the same user across multiple destination devices by comparing the user-specific data across the multiple devices. Multiple devices could share a category of user-specific data (e.g., typing rate or hand temperature) if the user-specific data on each of the sharing devices is within a pre-determined threshold of a mean or median value of the combined user-specific data for that category of user-specific data. If the user-specific data is being shared, newly measured user-specific data from each device may be combined into the shared user-specific data measurements even if the other devices have not re-measured that category of data. The combined user-specific data measurements are then made available to the destination devices that reported user-specific data within the pre-determined threshold of the mean or median value of the reported user-specific data.

Learning mode completes when a device has captured enough information whereby any additional data does not significantly change decision process, for example, where the standard deviation of newly measured user-specific data clusters nicely around the previously measured user-specific data for a given user. A user could also terminate learning mode early if the user desires.

After each learning mode session, the user-specific data may be sent to the user-specific characteristic server 335 where it may be stored, combined with prior results, combined with results from other devices reporting similar measurements and shared with other destination devices (e.g., destination device 100). In other embodiments, the user-specific data may be stored on the destination device 100. In still other embodiments, user-specific data stored on the destination device 100 may be shared with other similar destination devices.

In the described embodiment, the client software, running as a background process on the destination device 100, monitors sensor and input data. The client software uses the sensor and input data (e.g., data from camera, microphones, accelerometer, keyboard, touch screen, gyro, and location data) to determine the identification of the user of destination device 100 and the confidence level associated with the identification of the user of destination device 100. The user identification and associated confidence level is stored and provided in response to user identification and confidence level inquiries from the communication forwarding device 330 and communication receiving devices. A Confidence Level is a measure of the probability that measured levels of user-specified characteristics match previously measured levels of user-specific characteristics by a user on the same or similar device.

In some embodiments, device state (e.g., device power state, device movement state, device orientation) is monitored on destination device 100. Device state refers to the state of the device or its surroundings. Examples of determining device state include determining whether device power state is on or off, determining if a device is face up or face down and determining if a device is in an area that is dark or light. Device state is used to determine whether a device is in use or not. Thus, the device state may be used to determine whether the device is in use or not and set an "in use" variable to true or false. For example, if power is off or if the room is dark and there is no device motion or if the device is face down, the "in use" variable may be set to false. If power is on and the room is lit or power is on and the device is moving or if any of the user interfaces is being used, the "in use" variable may be set to true. It is recognized that other states may be measured besides those above and that these states may be combined in varying ways to determine if the device is in use or not.

If the "in use" variable is set to false, the probability of a user is set to zero or below other threshold to indicate that the user is not using the device. Also, if the "in use" variable is set to false, communication is not received by that device unless a specific override instruction has been entered, for example, to receive and store voice mail or text message on a particular destination device 100.

If the "in use" variable is set to true, the probability of a user may be measured on the destination device 100 to determine if the user is utilizing that device. The probability of a user is shared with the device responsible for forwarding communication, e.g., the communication receiving device 200 or the communication forwarding device 330, whereby incoming communication is forwarded to the destination device 100 with the highest probability of a user utilizing that device. If there is no response, the incoming communication may be forwarded to a destination device 100 with the next highest probability of a user utilizing that device and in repetitive succession until a response is obtained or all devices that have "in use" set to true have been attempted. The destination device 100 may also contain a clock capability that may be used to record the time the last known use of the destination device 100. If the last use is sufficiently recent, some embodiments may allow the destination device 100 to respond as if "in use" were true. This is based on the assumption that the user would still be nearby and accessible to audible or visual notification if the use were recent. destination device 100 may, in some embodiments, also track how often a user uses destination device 100 as well as how often a user receives communication on destination device 100.

When a communication receiving device 200 receives an incoming communication which is not subsequently answered on the communication receiving device 200, the communication receiving device 200 will review the available destination devices (e.g., destination device 100) to determine which, if any of the available destination devices is being used by the target recipient of the communication. The communication is forwarded to the destination device 100 that reported the highest probability of being in use, by the target recipient of the communication, above some minimum threshold probability. Checking for device state, probability of being in use, and the likely user of the destination devices that are in use may be done on demand, may be done periodically, or may be triggered at the destination device 100 when an in use state is detected. The destination device 100 is addressed by known addressing means such as IP address and socket number or by phone number. In other embodiments, if the target recipient is detected on a destination device 100 and the communication receiving device 200 is not being actively handled (e.g., no motion is detected or power is in standby), the communication receiving device 200 may automatically forward the communication to the destination device 100 without prior ringing or other notification on the communication receiving device 200. If none of the destination devices report a user confidence level above a pre-determined threshold for the target recipient, the communication may be forwarded to voice mail, email, inbox or other message recording service. Alternately, the incoming communication may be forwarded to the last known device to be used by the target recipient or to the device most frequently used by the target recipient.

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The invention claimed is:

1. A method implemented by a destination device comprising:
    receiving, by the destination device, one or more signals from a network device, the one or more signals comprising a request for a user presence probability value of a designated user;
    detecting, via use of one or more sensors of the destination device, user-specific characteristics of a detected user, the user-specific characteristics comprising blood pressure, skin conductivity, electro-encephalograph measurements (EEG), one or more fingerprints, one or more facial features, voice recognition, or any combination thereof;
    determining, by the destination device, a measured user-specific characteristic profile based, at least in part, on the user-specific characteristics of the detected user;
    comparing, by the destination device, the measured user-specific characteristic profile to a stored user-specific characteristic profile to determine a characteristic-specific user presence probability value, wherein the comparing comprises determining a measure of closeness between the measured user-specific characteristic profile and the stored user-specific characteristic profile;
    determining, by the destination device, the user presence probability value based at least in part on the characteristic-specific user presence probability value, the user presence probability value indicating a probability that the detected user is the designated user; and
    transmitting, by the destination device, one or more signals comprising the user presence probability value to the network device.

2. The method of claim 1, wherein the measured user-specific characteristic profile is based, at least in part, on at least one of typing rate, login status, active software, walking gait, body tremors, typing rates, key stroke patterns or word use.

3. The method of claim 1, wherein comparing the measured user-specific characteristic profile to the stored user-specific characteristic profile results in the characteristic-specific user presence probability value.

4. The method of claim 3, wherein the user presence probability value comprises the characteristic-specific user presence probability value.

5. The method of claim 3, wherein the user presence probability value comprises a combination of a plurality of characteristic-specific user probability values.

6. The method of claim 5, wherein the combination comprises calculating a median of the plurality of characteristic-specific user probability values.

7. The method of claim 5, wherein the combination comprises calculating a mean of the plurality of characteristic-specific user probability values.

8. The method of claim 5, wherein the combination comprises selecting a highest value of the plurality of characteristic-specific user probability values.

9. The method of claim 5, wherein none of the plurality of characteristic-specific user probability values indicates more than one user.

10. The method of claim 1, further comprising:
transmitting the user presence probability value to a communication forwarding device; and
receiving a communication from the communication forwarding device at least partially in response to the transmitting.

11. The method of claim 1, wherein:
transmitting the user presence probability value to a communication receiving device; and
receiving a communication from the communication receiving device at least partially in response to the transmitting.

12. The method of claim 10 wherein the communication comprises text, voice, pictures, video, music or some combination thereof.

13. The method of claim 1, further comprising sending a device status.

14. The method of claim 13, wherein the device status is sent to a communication receiving device.

15. The method of claim 13 wherein the device status is sent to a communication forwarding device.

16. The method of claim 13 wherein the device status comprises at least one of time of last movement, time of last use, charging status, ambient light status, or application status.

17. The method of claim 1, wherein the stored user-specific characteristic profile is associated with a verified user identification.

18. The method of claim 17, wherein the stored user-specific characteristic profile is input during a learning mode associated with the verified user identification.

19. An apparatus comprising:
a transceiver to receive one or more signals from a network device, the one or more signals comprising a request for the user presence probability value; and
a processor configured to, at least partially in response to receipt of one or more signals comprising the request:
determine a measured user-specific characteristic profile based, at least in part, user-specific characteristics of a detected user, wherein the user-specific characteristics are detected by the apparatus via use of one or more sensors of the apparatus, the user-specific characteristics comprising blood pressure, skin conductivity, electro-encephalograph measurements (EEG), one or more fingerprints, one or more facial features, voice recognition, or any combination thereof;
compare the measured user-specific characteristic profile to a stored user-specific characteristic profile to determine a characteristic-specific user presence probability value, wherein the comparison comprises a determination of a measure of closeness between the measured user-specific characteristic profile and the stored user-specific characteristic profile;
determine a user presence probability value based at least in part on the characteristic-specific user presence probability value, the user presence probability value indicating a probability that the detected user is the designated user.

20. The apparatus of claim 19, wherein the measured user-specific characteristic profile is based, at least in part, on at least one of typing rate, login status, active software, typing rates, key stroke patterns or word use.

21. The apparatus of claim 19, wherein the processor is further configured to compare the measured user-specific characteristic profile to the stored user-specific characteristic profile to result in the characteristic-specific user presence probability value.

22. The apparatus of claim 21, wherein the user presence probability value comprises the characteristic-specific user presence probability value.

23. The apparatus of claim 21, wherein the user presence probability value comprises a combination of a plurality of characteristic-specific user probability values.

24. The apparatus of claim 19, wherein the processor is further capable of:
initiating transmission of the user presence probability value to a communication forwarding device; and
process a communication received from the communication forwarding device.

25. The apparatus of claim 19, wherein the processor is further capable of:
initiating transmission of the user presence probability value to a communication receiving device; and
process a communication received from the communication receiving device.

26. The apparatus of claim 19, wherein the transceiver is further capable of sending a device status.

27. The apparatus of claim 26, wherein the device status is sent to a communication receiving device.

28. The apparatus of claim 26 wherein the device status is sent to a communication forwarding device.

29. The apparatus of claim 26 wherein the device status comprises at least one of the group consisting of time of last movement, time of last use, charging status, ambient light status, or application status.

30. An apparatus comprising:
means for receiving one or more signals from a network device, the one or more signals comprising a request for a user presence probability value of a designated user;
means for determining a measured user-specific characteristic profile based, at least in part, on user-specific characteristics of a detected user, wherein the user-specific characteristics are detected by the apparatus via use of one or more sensors of the apparatus, the user-specific characteristics comprising blood pressure, skin conductivity, electro-encephalograph measurements (EEG), one or more fingerprints, one or more facial features, voice recognition, or any combination thereof;

means for comparing the measured user-specific characteristic profile to a stored user-specific characteristic profile to determine a characteristic-specific user presence probability value based at least in part on the characteristic-specific user presence probability value, wherein the comparing comprises determining a measure of closeness between the measured user-specific characteristic profile and the stored user-specific characteristic profile;

means for determining the user presence probability value, the user presence probability value indicating a probability that the detected user is the designated user; and means for initiating transmission of one or more signals comprising the user presence probability value to the network device.

31. The apparatus of claim 30, wherein the measured user-specific characteristic profile is based, at least in part, on at least one of typing rate, login status, active software, typing rates, key stroke patterns or word use.

32. The apparatus of claim 30, wherein comparing the measured user-specific characteristic profile to the stored user-specific characteristic profile results in the characteristic-specific user presence probability value.

33. The apparatus of claim 32, wherein the user presence probability value comprises the characteristic-specific user presence probability value.

34. The apparatus of claim 32, wherein the user presence probability value comprises a combination of a plurality of characteristic-specific user probability values.

35. The apparatus of claim 30, further comprising:
means for transmitting the user presence probability value to a communication forwarding device; and
means for receiving the communication from the communication forwarding device.

36. The apparatus of claim 30, further comprising:
means for transmitting the user presence probability value to a communication receiving device; and
means for receiving the communication from the communication receiving device.

37. The apparatus of claim 30, further comprising means for sending a device status.

38. The apparatus of claim 37, wherein the device status is sent to a communication receiving device.

39. The apparatus of claim 37 wherein the device status is sent to a communication forwarding device.

40. The apparatus of claim 37 wherein the device status comprises at least one of last movement, time of last use, charging status, ambient light status, and application status.

41. A non-transitory computer-readable storage medium comprising program code executable by one or more processors to:
process a received request for a user presence probability value of a designated user received via one or more signal transmitted by a network device;
determine a measured user-specific characteristic profile based, at least in part, on user-specific characteristics of a detected user, wherein the user-specific characteristics are detected by a destination device via use of one or more sensors of the destination device, the user-specific characteristics comprising blood pressure, skin conductivity, electro-encephalograph measurements (EEG), one or more fingerprints, one or more facial features, voice recognition, or any combination thereof;
compare the measured user-specific characteristic profile to a stored user-specific characteristic profile to determine a characteristic-specific user presence probability based at least in part on the characteristic-specific user presence probability value, wherein the comparison comprises a determination of a measure of closeness between the measured user-specific characteristic profile and the stored user-specific characteristic profile;
determine the user presence probability value, the user presence probability value indicating a probability that the detected user is the designated user; and
initiate transmission of one or more signals comprising the user presence probability value to the network device.

42. The non-transitory computer-readable storage medium of claim 41, wherein the measured user-specific characteristic profile is based, at least in part, on at least one of typing rate, login status, active software, typing rates, key stroke patterns or word use.

43. The non-transitory computer-readable storage medium of claim 41, wherein comparing the measured user-specific characteristic profile to the stored user-specific characteristic profile results in the characteristic-specific user presence probability value.

44. The non-transitory computer-readable storage medium of claim 43, wherein the user presence probability value comprises the characteristic-specific user presence probability value.

45. The non-transitory computer-readable storage medium of claim 43, wherein the user presence probability value comprises a combination of a plurality of characteristic-specific user probability values.

46. The non-transitory computer-readable storage medium of claim 41, wherein the program code is further executable by the one or more processors to:
initiate transmission of the user presence probability value to a communication forwarding device; and
process a communication received from the communication forwarding device.

47. The non-transitory computer-readable storage medium of claim 41, wherein the program code is further executable by the one or more processors to:
initiate transmission of the user presence probability value to a communication receiving device; and
process a communication received from the communication receiving device.

48. The non-transitory computer-readable storage medium of claim 41, further comprising initiating transmission of a device status.

49. The non-transitory computer-readable storage medium of claim 48, wherein the device status is sent to a communication receiving device.

50. The non-transitory computer-readable storage medium of claim 48 wherein the device status is sent to a communication forwarding device.

51. The non-transitory computer-readable storage medium of claim 48 wherein the device status comprises at least one of last movement, time of last use, charging status, ambient light status, or application status.

* * * * *